No. 802,233. PATENTED OCT. 17, 1905.
W. J. O'DONNELL.
CURATIVE APPARATUS.
APPLICATION FILED MAY 25, 1905.
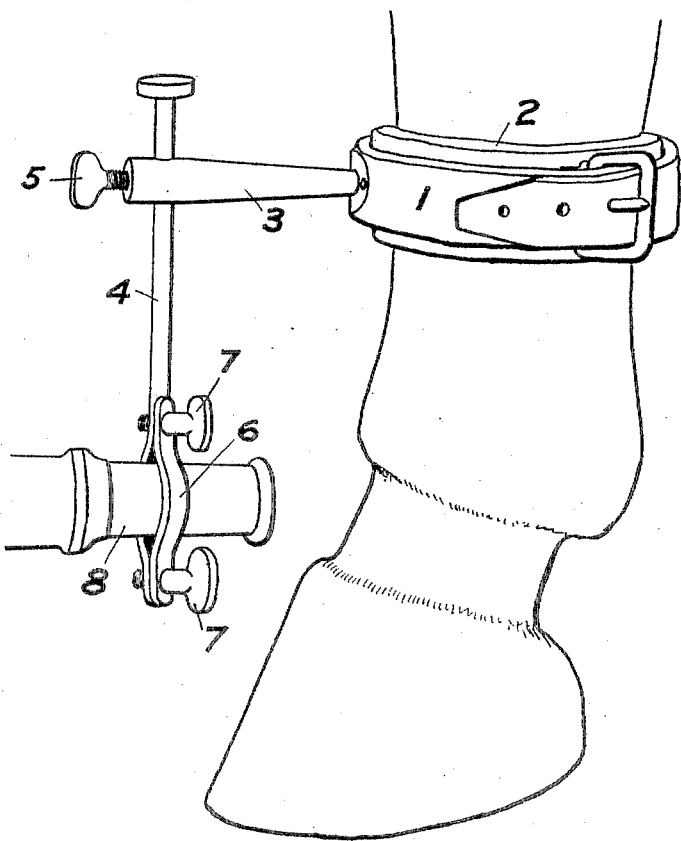
WITNESSES:
E. R. Richmond
D. Gurnee
INVENTOR:
William J. O'Donnell

UNITED STATES PATENT OFFICE.

WILLIAM J. O'DONNELL, OF ROCHESTER, NEW YORK.

CURATIVE APPARATUS.

No. 802,233.                    Specification of Letters Patent.                    Patented Oct. 17, 1905.

Application filed May 25, 1905. Serial No. 262,281.

*To all whom it may concern:*

Be it known that I, WILLIAM J. O'DONNELL, a citizen of the United States, and a resident of Rochester, in the county of Monroe and State of New York, have invented certain new and useful Improvements in Curative Apparatus, of which the following is a specification.

This invention relates to a curative apparatus intended mainly for use in connection with animals, and especially horses and cattle.

An efficient mode of treating bruised, irritated, and sometimes diseased limbs of animals—as, for instance, the leg of a horse—is by pouring a stream of water upon the limb at the point affected. Heretofore it has been universally customary for the person in charge of the animal to hold the end of a hose at the desired point and pour the stream of water upon it for such length of time as might have been deemed necessary. This mode of holding the stream of water was defective, in that the stream of water could not be poured upon the exact spot for any great length of time on account of the person holding the hose becoming tired and unable to direct it uniformly. In order to obviate these difficulties and to produce an apparatus not requiring continuous attention, the device herein described and claimed was produced.

The figure shown in the drawing is a perspective view of my apparatus.

This device consists of a strap 1, adapted to be passed around the leg or any other suitable portion of an animal, which strap may have a padding 2 within it. Of course for the strap may be substituted any other suitable holding device. To the strap is rigidly fastened the standard 3, through which passes the rod 4. The rod 4 is adjustable in the standard 3 and may be clamped at any suitable point of extension by means of the set-screw 5. Upon the rod 4 is fastened the clamping device, consisting in the present instance of a plate or bar 6, held to the rod 4 by adjustable means, such as the pair of set-screws 7. The rod 4 may be bowed or hollowed, as shown, and the clamping-plate 6 may be a corresponding form, so that between the two parts of the clamp the hoze or nozzle 8 may be fastened in order to direct the stream of water upon the part which is desired to be treated.

It will be obvious that the stream of water may by this apparatus be directed to any part upon the limb or part of the animal to which the device may be attached. The strap 1 may be rotated around said limb or part, and the rod 4 may be retracted or extended and clamped in any desired position of extension.

The device may be set so that the rod extends upward instead of downward, with the hose clamped above the standard 3, and the holding device or strap 1 may be fastened around any portion of the limb or any other part of the animal as desired. The strap 1 may have any suitable length.

What I claim is—

1. In a curative apparatus, a holding device adapted to be attached to an animal, a standard rigidly fastened to said holding device, a rod carried by said standard and adapted to be clamped at different points of extension with reference to said standard, and a clamp upon said rod for holding a hose.

2. In a curative apparatus, a strap, a standard rigidly fastened to and projecting from said strap, a rod passing through said standard, a set-screw for fastening said rod in different positions of extension, and a clamp upon said rod for holding the hose.

3. In a curative apparatus, a strap, a standard rigidly fastened to and projecting from said strap, a rod passing transversely through said standard, a set-screw for fastening said rod in different positions of extension, a clamping-plate and set-screws for fastening the same to said rod whereby the hose may be held thereon.

WILLIAM J. O'DONNELL.

Witnesses:
   E. R. RICHMOND,
   D. GURNEE.